UNITED STATES PATENT OFFICE.

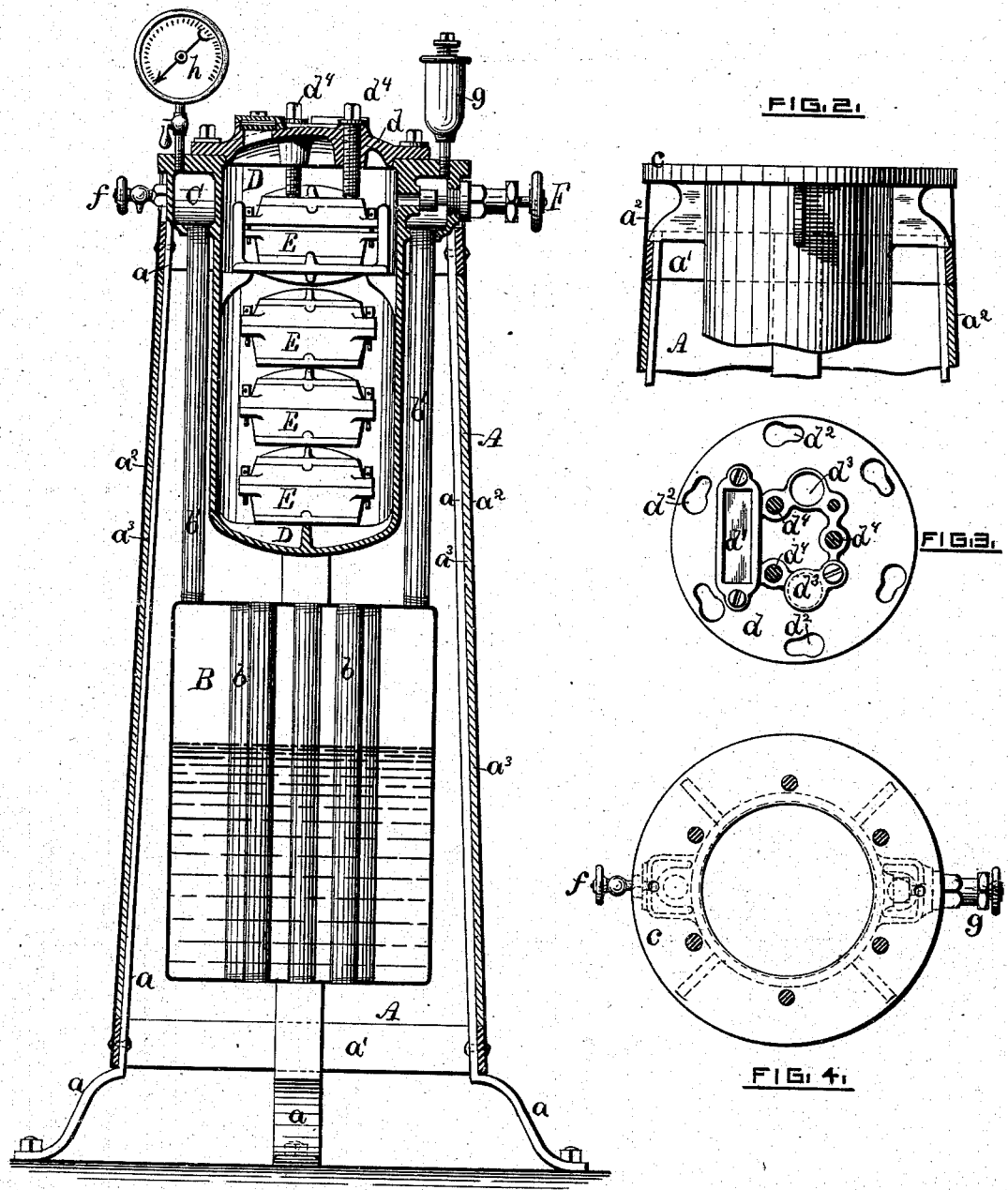

FREDERICK W. SEABURY, OF PROVIDENCE, RHODE ISLAND.

DENTAL VULCANIZER.

SPECIFICATION forming part of Letters Patent No. 295,821, dated March 25, 1884.

Application filed October 19, 1883. (No model.)

*To all whom it may concern:*

Be it known that I, FREDERICK W. SEABURY, of the city and county of Providence, State of Rhode Island, have invented a new and useful Improvement in Dental Vulcanizers; and I hereby declare the following to be a full, clear, and exact description of the same, reference being had to the accompanying drawings, forming part of this specification.

This invention has reference to an improvement in ovens or heaters into which one or more dental flasks can be placed and subjected to heat, so as to vulcanize the soft rubber or other compound.

The invention consists in the peculiar and novel construction of the oven and the steam-generator connected with the same, by which the products of combustion and the steam-pipes surround the oven, and the steam can be admitted to the oven or heater, so that any desired degree of heat, with or without moisture, can be obtained in the oven, and two or more flasks can be vulcanized at the same time, as will be more fully set forth hereinafter.

When artificial teeth are to be inserted into artificial gums made of india-rubber or of celluloid, the gums are placed into what are known as "dental flasks," and the teeth are inserted into the gum. This operation is performed in the oven while the flask is subjected to heat, and the best results are obtained at a temperature of from 300° to 330° Fahrenheit. While the flask is exposed to this high temperature, it must be forced together by pressure until the flask is entirely closed, when the two parts may be secured together and the process of vulcanization continued. The first operation described above is preferable when performed under a dry heat and before steam is admitted to the oven or heater, and this operation has to be carefully watched, so that the flask is closed gradually to force the celluloid or rubber sheet into the mold and embed the teeth firmly into the gum, when the flask is locked and placed into the lower part of the stove or heater until the same is filled. The oven or heater is now closed, and steam is applied until the process of vulcanization is completed.

Figure 1 is a vertical section of the improved dental vulcanizer, showing the steam-generator suspended below the oven. Fig. 2 is an enlarged view of the upper end of the oven. Fig. 3 is a top view of the cover for the oven. Fig. 4 is a top view of the end of the oven.

In the drawings, A is a conical case forming the support of the device. It consists of the standards $a$, the rings $a'$, to which the standards are secured, the outer sheet-metal casing, $a^2$, and a lining of asbestus or other slow-conducting material, $a^3$, by which the heat from the gas-burner is retained within the casing and utilized in heating the oven.

B is the steam-generator, constructed like an ordinary vertical tubular steam-boiler.

$b\ b$ are tubes open at each end, so that the products of combustion from a gas-burner placed underneath the steam-generator can pass through the same.

$b'\ b'$ are tubes extending from the top of the steam-generator to the steam-chamber C, partially or wholly surrounding the upper end of the oven or heater D. Two steam pipes or tubes $b'\ b'$ are shown in the drawings, but a greater number may be used. $d$ is the cover of the oven D. This cover is provided with the sight-opening $d'$, protected with a glass plate. The bolt-holes $d^2$ are large enough at one end so that the heads of the bolts can pass through them, and the cover can be removed by partially rotating and lifting it without removing the bolts. $d^3$ are openings provided with a hinged cover, which can be readily opened and closed.

$d^4$ are the screws by which pressure is exerted on the flask during the process of heating and closing the same.

E E are the flasks, the upper one of which is shown as partly closed and resting on a plate supported by brackets extending from the sides of the oven D. The screws $d^4\ d^4$ are shown bearing against the cover of the upper flask. When this process is completed, each flask is lowered into the oven until, as shown in Fig. 1, the oven is full, when the last one is left in its place, and, preferably, a plain cover is secured in place of the cover $d$. The steam-valve F is now opened and steam is admitted into the oven so as to surround the flasks.

It will be observed that the products of combustion surround the oven D, the steam-pipes $b\ b'$, and the upper part of the steam-generator B. The steam is thereby superheated and a higher temperature secured, by which the process of vulcanization is much facilitated.

$f$ is a blow-off cock. $g$ is a safety-valve, and $h$ a steam-gage.

A thermometer may be inserted through either of the holes $d^3\ d^3$; or one may be permanently secured in each or either of the covers to measure the temperature.

The upper flange, $c$, of the oven D is faced true, so as to secure a tight joint between the same and the cover. Any suitable packing may be used to facilitate the making of a tight joint and prevent the escape of steam.

It is obvious that this apparatus can be heated by gas, by kerosene, or an alcohol lamp, and that with either kind of lamp the heat generated is most thoroughly used in heating the oven, both directly and by the steam generated. When the process of vulcanization is completed, the steam-valve F is closed and the flasks are removed; to repeat the process of molding, each flask is replaced, as before described, until the same is firmly closed, thus again filling the oven, when steam is turned on again to complete the process of vulcanizing. As two, four, or more flasks are operated upon at one time, much saving in time results, and much more work can be done in one apparatus. Great strength is secured in this construction of the dental vulcanizer, no flat or large surfaces being subjected to the steam-pressure. A high pressure of steam can therefore be used with perfect safety.

The boiler can be readily filled by either removing the safety-valve or by providing a separate inlet closed by a valve or cock.

Having thus described my invention, I claim as new and desire to secure by Letters Patent—

1. In a dental vulcanizer, the combination, with the oven or heater D and cover $d$, of the steam-generator B, the steam-tubes $b'\ b'$, the steam-valve F, and the case A, inclosing the whole, as described.

2. In a dental vulcanizer, the combination, with the case A, constructed to support the oven and steam-generator and inclose the same, of the oven D and boiler B, constructed to expose the oven to the heat of the fire externally and supply steam internally, as described.

3. The combination, in a dental vulcanizer, of the oven D, the vertical tubular boiler B, steam-tubes $b'\ b'$, and case A, constructed so that the heat applied will pass through the tubes of the boiler and surround the oven, as described.

4. The combination, with the case A, the oven D, constructed to receive two or more flasks successively and exert pressure on each during the process of molding, of the steam-boiler B, the tubes $b'\ b'$, valve F, and the case A, inclosing the whole and supporting the boiler above the burner, as described.

5. The combination, with the oven D, steam-boiler B, and tubes $b'\ b'$, of the steam-space C, partially or wholly surrounding the upper end of the oven, as described.

6. The combination, with the oven D, constructed to receive two or more flasks, of the cover $d$, provided with the glass-covered opening $d'$, the openings $d^3\ d^3$, and the screws $d^4\ d^4$, constructed to force the two parts of the flask together, as described.

7. The combination, with the oven D and the cover $d$, provided with the screws $d^4\ d^4$, of a shelf constructed to support the flask during the process of molding and allow a flask to be passed below the support, as described.

FREDERICK W. SEABURY.

Witnesses:
M. F. BLIGH,
J. A. MILLER, Jr.